(12) United States Patent
Maignan et al.

(10) Patent No.: US 11,788,515 B2
(45) Date of Patent: Oct. 17, 2023

(54) CABLE GUIDING ASSEMBLIES AND METHODS FOR WIND TURBINES

(71) Applicant: General Electric Renovables Espana, S.L., Barcelona (ES)

(72) Inventors: Joel Maignan, Nantes (FR); Sébastien Digard Brou De Cuissart, Nantes (FR); Alan Pfeiffer, Nantes (FR); Patrice Denis, Nantes (FR)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/690,413

(22) Filed: Mar. 9, 2022

(65) Prior Publication Data
US 2022/0290657 A1 Sep. 15, 2022

(30) Foreign Application Priority Data
Mar. 11, 2021 (EP) .................... 21382196

(51) Int. Cl.
*F03D 80/80* (2016.01)
*B66D 1/36* (2006.01)

(52) U.S. Cl.
CPC ............. *F03D 80/85* (2016.05); *B66D 1/36* (2013.01); *F05B 2230/60* (2013.01)

(58) Field of Classification Search
CPC .................................................... F03D 80/85
See application file for complete search history.

(56) References Cited

U.S. PATENT DOCUMENTS

| 8,866,330 B2 | 10/2014 | Domesle et al. |
| 10,128,641 B2 | 11/2018 | Cuppen et al. |
| 2010/0247326 A1* | 9/2010 | Prebio ..................... F03D 80/00 29/889 |
| 2016/0322793 A1* | 11/2016 | Cuppen .................... H02G 3/32 |

FOREIGN PATENT DOCUMENTS

| CN | 105429092 A | 3/2016 |
| DE | 102011076940 A1 | 12/2011 |
| WO | WO2015091152 A1 | 6/2015 |

OTHER PUBLICATIONS

English Translation of CN 105429092 A (Year: 2016).*
European Search Report Corresponding to EP21382196 dated Sep. 1, 2021.

* cited by examiner

*Primary Examiner* — Sean Gugger
(74) *Attorney, Agent, or Firm* — Dority & Manning, P.A.

(57) ABSTRACT

The present disclosure relates to cable guiding assemblies for wind turbine power cables. A cable guiding assembly comprises an outer part and a central part. Each part has a top surface, a bottom surface, a laterally inner surface and a laterally outer surface. The laterally inner surface has a plurality of recesses suitable for receiving power cables. An outer portion of the central part is configured to be attached to an inner portion of the outer part.

13 Claims, 7 Drawing Sheets

CABLE GUIDING ASSEMBLIES AND METHODS FOR WIND TURBINES

The present disclosure relates to wind turbines, in particular to guiding systems and methods for power cables of a wind turbine.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly or through a gearbox. This way, the generator produces electricity which can be supplied to the electrical grid.

The wind turbine hub may be rotatably coupled to a front of the nacelle. The wind turbine hub may be connected to a rotor shaft, and the rotor shaft may then be rotatably mounted in the nacelle using one or more rotor shaft bearings arranged in a frame inside the nacelle. The nacelle is a housing arranged on top of a wind turbine tower that contains and protects e.g. the gearbox (if present) and the generator and, depending on the wind turbine, further components such as a power converter, and auxiliary systems.

Power cables carry electrical energy from the generator in the nacelle down the wind turbine tower and up to the electrical grid. A power cable usually includes a bunch of metallic wires, e.g. copper wires, surrounded by a protective and flexible cover, e.g. a rubber cover. Power cables in wind turbine are expected to withstand vibrations, bending, torsion, abrasion, a wide range of temperature and electromagnetic interferences. In offshore wind turbines, they should also be resistant to salt water and salt sea air. Power cables should allow the nacelle to yaw while constantly and reliably carrying electrical energy.

Depending on the internal layout of the wind turbine, and particularly the generator and the nacelle, power cables have to run through tight spaces. This can lead to tangling of the cables as well as increase electromagnetic interference among them. Cables may get damaged if they come into contact with sharp portions or if temperature increases due to lack of sufficient separation among them. Cable spacers and cable guides are known to group and route power cables in an organized way.

The size and shape of cable spacers and guides may be adapted to a space and configuration through which cables have to pass.

SUMMARY

In an aspect of the present disclosure, a cable guiding assembly is provided. A cable guiding assembly comprises a central part having a top surface, a bottom surface, a laterally inner surface and a laterally outer surface, the laterally inner surface having a plurality of central recesses forming central openings suitable for receiving a wind turbine power cable. The assembly further comprises an outer part surrounding the central part and having a top surface, a bottom surface, a laterally inner surface and a laterally outer surface, the laterally inner surface having a plurality of outer recesses forming outer openings suitable for receiving a wind turbine power cable. An outer portion of the central part is configured to be attached to an inner portion of the outer part, such that the central part delimits the outer openings.

Such a guiding system may enable to guide power cables in an ordered and controlled way in a tight space, e.g. through an opening in a wind turbine surface. Sufficient separation among cables may be also obtained. This guiding system may be particularly useful for power cables whose trajectory changes from a first direction to a second different direction, for example from a substantially horizontal trajectory to a vertical one. The transition of the power cables to the second direction may therefore be more organized while increased temperature due to power losses of the cables may be avoided.

DETAILED DESCRIPTION OF EXAMPLES

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
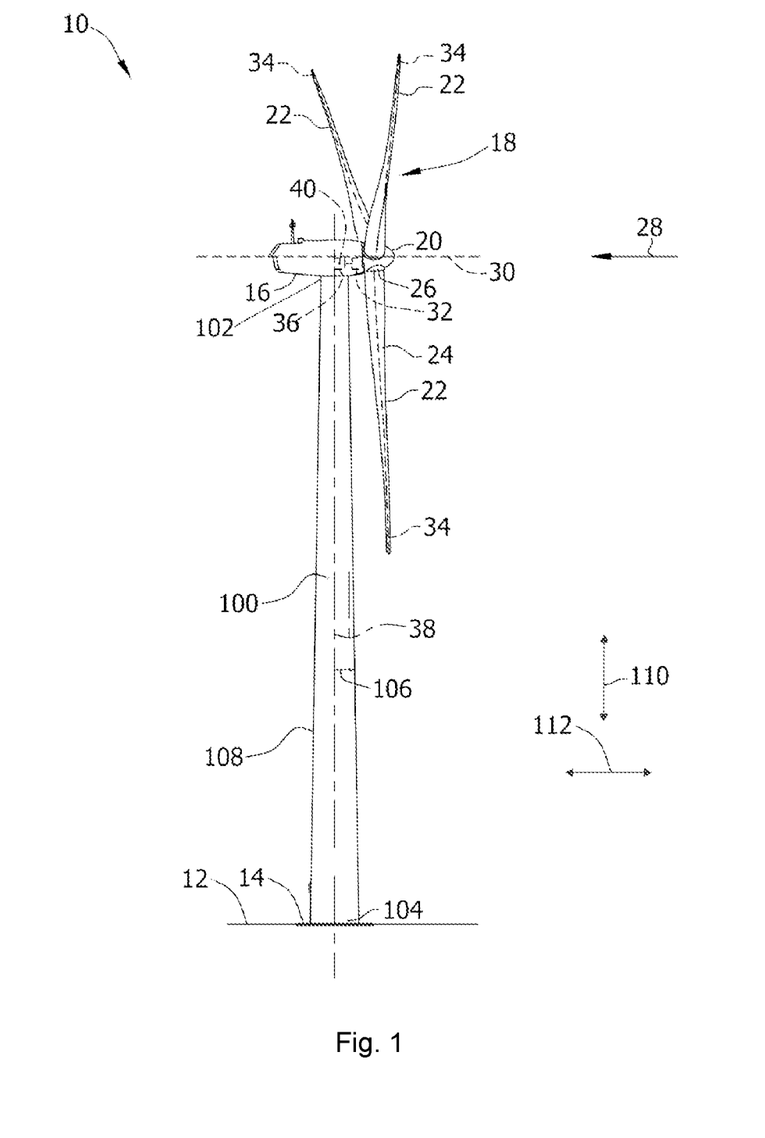
FIG. 1 schematically illustrates a perspective view of one example of a wind turbine.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 100 that extends from a support system 14 on a ground 12, a nacelle 16 mounted on tower 100, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 100 may be fabricated from tubular steel to define a cavity (not shown in FIG. 1) between a support system 14 and the nacelle 16. In an alternative embodiment, the tower 100 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
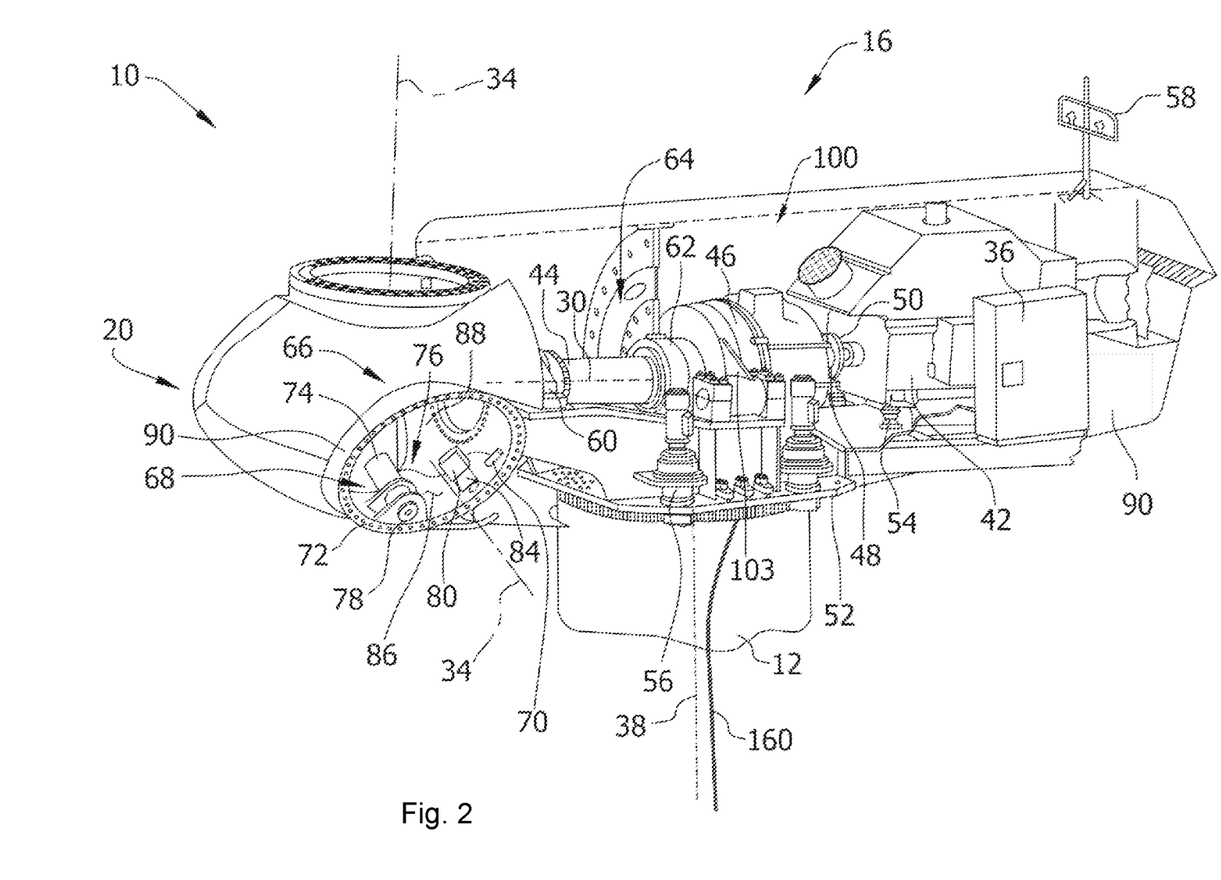
FIG. 2 illustrates a simplified, internal view of one example of the nacelle of the wind turbine of FIG. 1.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (10-35 KV). Said electrical energy is conducted via power cables 160 from the nacelle 16 into the tower 100.

The gearbox 46, generator 42 in transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 100 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angel of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery, electric capacitors hence letter or an electrical generator driven by the rotation of the hub 20, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to outer surface.

In one aspect of the disclosure, a cable guiding assembly 300 for wind turbine power cables 780 is provided. The cable guiding assembly 300 comprises an outer part 400 and a central part 500. The outer part has a top surface 405, a bottom surface 410, a laterally inner surface 415 and a laterally outer surface 420. The laterally inner surface 415 of the outer part has a plurality of recesses 425 forming outer openings suitable for receiving a wind turbine power cable. The central part 500 has a top surface 505, a bottom surface 510, a laterally inner surface 515 and a laterally outer surface 520. The laterally inner surface 515 has a plurality of central recesses 525 forming central openings suitable for receiving a wind turbine power cable. An outer portion 530 of the central part 500 is configured to be attached to an inner portion 435 of the outer part 400.

The outer recesses 425 form outer openings for receiving power cables. The outer openings are delimited by the central part.

Placing a power cable per recess 425, 525 in a part 400, 500 may help to organize the passage of power cables. It may facilitate changing a trajectory of power cables in a controlled and order manner, for example from a horizontal or close to horizontal direction to a vertical direction.

A power cable may be easily placed in an outer recess 425, or central recess 525 by pushing the cable towards a laterally outer surface 420, 520 of the part. The cable in the outer recess may be secured by attaching an outer portion 530 of the central part 500 to an inner portion 435 of the outer part 400. Attachment may be mechanically, e.g. through nuts and bolts.

The central part and the outer part may be shaped and sized such that a sufficient distance is arranged between the cables merely by placing the cables in the recesses. A sufficient distance among cables for avoiding an excessive increase of temperature in a cable harness due to heat dissipation by the cables may also be provided. For example, cables may be spaced at least one cable diameter from one another. By using two consecutive or slightly overlapping parts for cable placement, space of passage for the power cables may be better utilized.

Figure 3A:
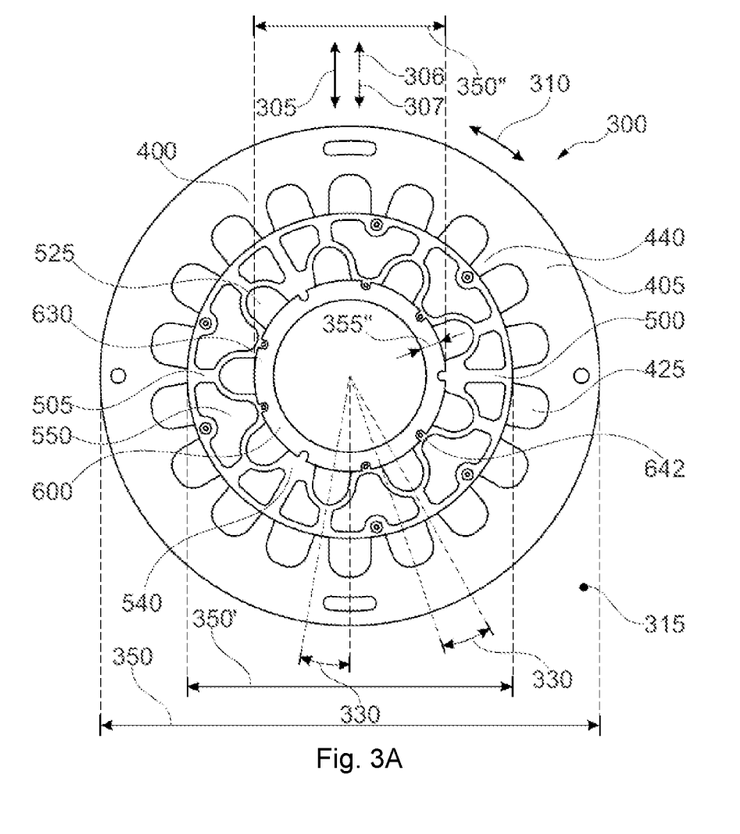
FIGS. 3A and 3B schematically illustrate two examples of a guiding system for power cables for a wind turbine.
Figure 3B:
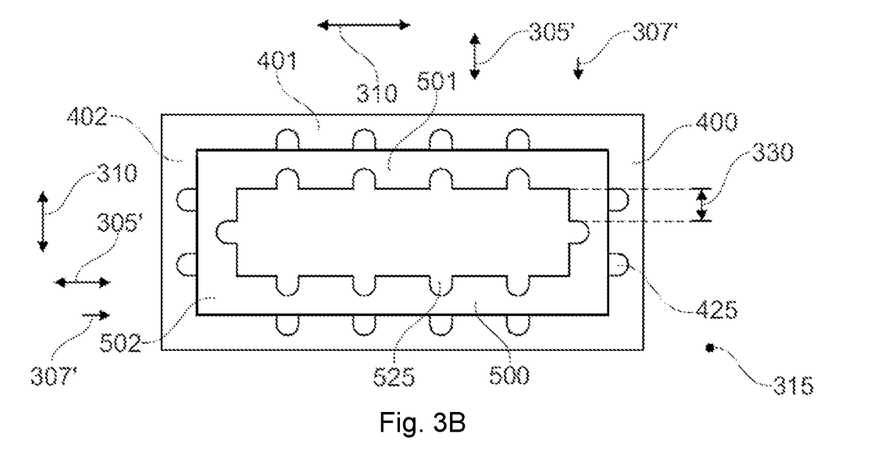
Figure 4A:
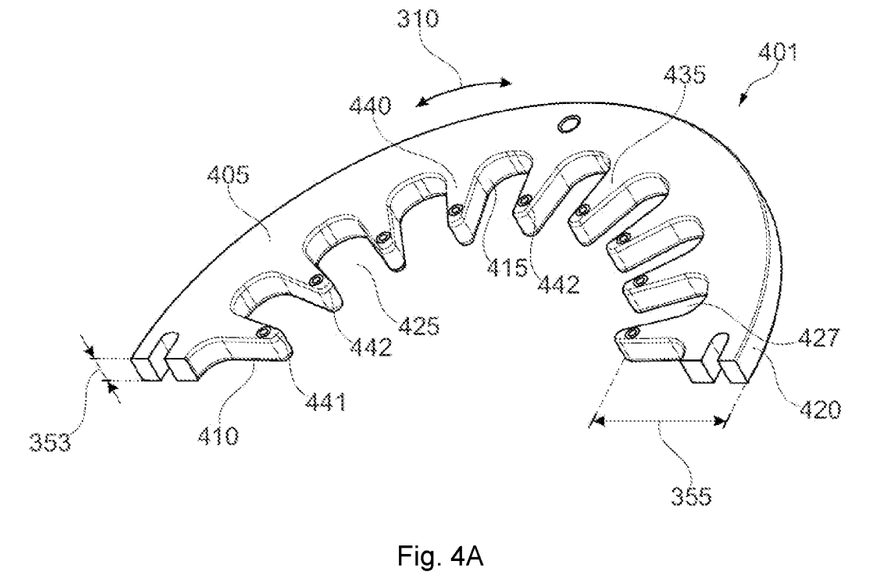
FIG. 4A schematically illustrates an example of a component of an outer part of the cable guiding assembly of FIG. 3A.
Figure 4B:
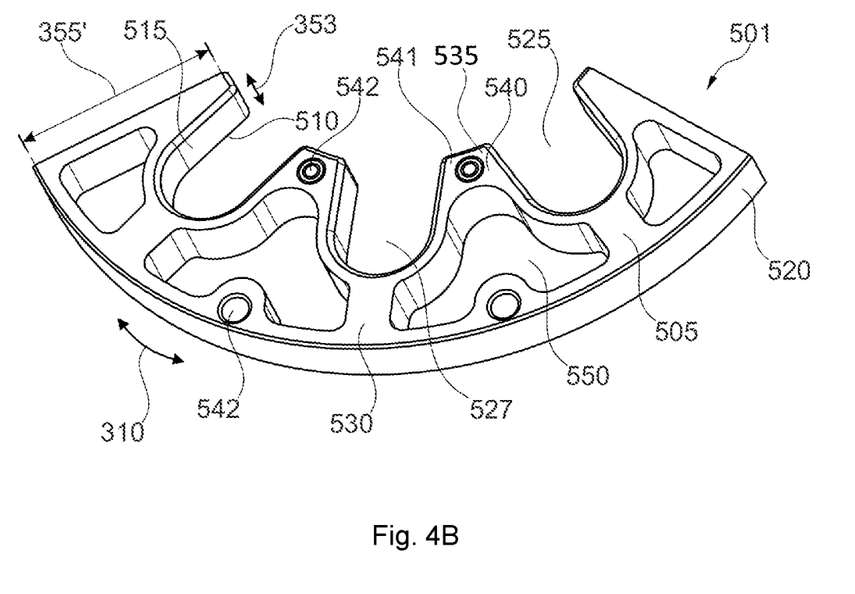
FIG. 4B schematically illustrates an example of a component of a central part of the cable guiding assembly of FIG. 3A.

FIGS. 3A and 3B schematically represent a top view of two examples of a cable guiding assembly 300. FIG. 4A schematically illustrates a perspective view of an example of a component 401 of an outer part 400 of FIG. 3A. FIG. 4B schematically illustrates an example of a perspective view of a component 501 of a central part 500 of FIG. 3A.

In FIG. 3A, the outer part 400 and the central part 500 are annular. The laterally inner surface 415, 515 is a radial inner surface 415, 515 and the laterally outer surface 420, 520 is a radially outer surface 420, 520. The recesses 425, 525 extend partially in a radially outward direction 306 and extend through the entire thickness of the parts. Recesses 425, 525 may thus be seen as blind holes extending along a radially outward direction 306 and as a through holes extending along an axial direction 315.

The recesses 425, 525 are separated along a circumferential direction 310. A protrusion 440, 540 extending in a radially inward direction 307 may separate two consecutive recesses, both in the outer part and in the central part. Protrusions 440, 540 and recesses 425, 525 may have complementary shapes and may form a wavy radial inner surface 415, 515.

In FIG. 3B, the outer part 400 and the central part 500 have a rectangular shape. The recesses 425, 525 extend partially towards a laterally outer surface 420, e.g. perpendicularly to a laterally outer surface 420, of a corresponding part 400, 500, and extend through the thickness of the parts.

Recesses 425, 525 may thus be seen as blind holes extending towards a laterally outer surface 420 and as a through holes extending along an axial direction 315.

The recesses 425, 525 are separated along a circumferential direction 310 (in the same part 400 or 500). Herein, a lateral direction 310 may refer to a direction which is substantially parallel to a laterally outer wall 520 of the central part 500, and possibly also to an outer wall 420 of the outer part 400. A direction substantially perpendicular to the lateral direction 310 and the axial direction 315 may be called transverse lateral 305' direction. The lateral 310 transverse and lateral 305' directions are shown in FIG. 3B with respect to portions 401 and 501 of the parts 400 and 500. These directions 310, 305' are also shown with respect to portions 402 and 502 of parts 400 and 500.

A protrusion 440, 540 extending towards a lateral inner surface 415, 515, e.g. perpendicularly to a lateral inner surface 415, 515, may separate two consecutive recesses of a part. Protrusions 440, 540 and recesses 425, 525 may have complementary shapes and may form a wavy lateral inner surface 415, 515.

Independently of the shape of the parts 400, 500, an outward end 427, 527 of a recess 425, 525 may be rounded. A rounded recess 425, 525, e.g. having a semi-circular or semi-oval shape, when looking a part 400, 500 from the top or the bottom may reduce or avoid damage to a power cable when the cable passes through the recess.

An inward end 441, 541 of a protrusion 440, 540 may be rounded, as in FIG. 4A, or straight, as in FIG. 4B. Other shapes are possible. An inward end 441, 541 of a protrusion 440, 540 may be truncated.

A protrusion 440, 540 may have an axial receptacle or hole 442, 542 for receiving a fastener for attaching the outer part 400 to the central part 500, and the central part 500 to an inner part 600 respectively.

An outer part 400 may have a laterally outer surface 420 of any suitable shape, independently of the closed shape that a wavy laterally inner surface 415 or the protrusions 440 may form. In FIG. 3A, a laterally outer surface 420 is circular and the protrusions 400 form a circular shape, but the laterally outer surface 420 could also be squared or have other shapes. The same applies to the outer part 400 of FIG. 3B.

In general, a laterally outer surface 520 of a central part 500 may have a shape corresponding to a shape formed when joining the tips 441 of the outer part 400. Such a shape is a circle in FIG. 3A and a rectangle in FIG. 3B. Other shapes are possible.

The recesses 525 in the central part 500 may be offset 330 from the recesses 425 in the outer part 400 along a lateral direction 310, as illustrated for example in FIGS. 3A and 3B.

An offset 330 between recesses in the central 500 and outer 400 parts may enable to arrange power cables in trefoils. In particular, power cables could easily pass from a flat arrangement to a trefoil arrangement. A trefoil of cables may include cables carrying a same electrical phase.

In FIG. 3A all the recesses 525 in the central part 500 are offset 330 from a corresponding consecutive recess 425 in the outer part 400 in a circumferential direction 310. In other words, no recess 525 in the central part 500 is aligned with a recess 425 in the outer part 400 in a radial direction 305.

In other examples, some recesses 525 in the central part 500 may be aligned in a radial direction 305 with some recesses 425 in the outer part 400 whereas some of the recesses 525 in the central part 500 may be offset 330 from a consecutive corresponding recess 400 in the outer part 400. Still in some other examples, all the recesses 525 in the central part 500 may be aligned in a radial direction 305 with all the corresponding recesses 425 in the outer part 400.

The same applies for other geometries of the parts 400, 500. For example, in FIG. 3B some recesses in part 400 are aligned with some recesses in part 500 in a transverse lateral direction 305' whereas some recesses in part 400 are offset 330 with consecutive recesses in part 500 in a lateral direction 310.

A number of recesses 425 in the outer part 400 may be twice the number of recesses 525 in the central part 500. This can be seen in FIG. 3A, where there are nine recesses 525 in the central part 500 and eighteen recesses 425 in the outer part 400.

In this way, a number of obtainable trefoil arrangements may be maximized while keeping a suitable distance among the cables for avoiding excessive heating. The number of trefoil arrangements would match the number of recesses 525 in the central part 500.

The cable guiding assembly 300 may comprise an inner part 600 configured to be attached to an inner portion 535 of the central part 500. The inner part 600 may be attached to one or more protrusions 540, and in particular to one or more protrusion tips 541. Holes 542 may be provided to this end.

An inner part 600 delimit the central openings and may secure the power cables placed in the recesses 525 of the central part 500. A dislodging power cable may therefore be avoided.

The inner part 600, like the outer 400 and central 500 parts, may have a top, a bottom, a lateral inner surface and a laterally outer surface. Its laterally outer surface may have a shape which results from joining the protrusions 540, e.g. the tips 541 of the protrusions, of the central part 500. The inner part 600 may have a laterally outer portion 630, e.g. a radially outer portion, by which it may be joined to the central part 500. Receptacles or holes 642 for fastening may be provided e.g. on the laterally outer portion 630.

The inner part 600 has an annular shape in FIG. 3A, and may have a rectangular shape in FIG. 3B. Other shapes are also possible. An inner part 600 may be hollow in an axial direction 315, as in FIG. 3A. This may not be the case in other examples and the part may have a solid inside.

The central part 500 may further comprise one or more through-holes 550 extending in an axial direction 315. These holes 550 may have a T-shape, a V-shape or a similar shape in some examples, as in FIG. 4B. Cooling of the power cables may be enhanced and weight of the central part 500 may be reduced. The one or more through holes 550 for cooling are different from the recesses 525 for routing the cables. The first ones 550 have a closed cross-section in a plane perpendicular to an axial direction 315 whereas the second ones 525 have an open cross-section in a plane perpendicular to an axial direction 315.

If the through holes 550 have a shape that substantially conforms or adapts to the shape of the recesses 525 and a laterally outer surface 520 of the central part 500, cooling of the power cables and weight reduction of the part may be further maximized.

The shape of the holes 550 may take into account other features of the central part 500. For example, if receptacles or holes for fasteners 542 are provided in the part 500, the shape of the cooling holes 550 may adapt to them 542, as in FIG. 4B.

The outer part 305 and/or the inner part 600 may likewise include one or more cooling through holes extending in an axial direction 315.

At least one of the outer 400 and the central 500 parts may comprise more than one sub-parts or segments 401, 501.

FIGS. 4A and 4B schematically illustrate a possible segment 401 of the outer part 400 and a segment of the central part 500 of FIG. 3A. An outer annular part 400 may for example include two segments 401 and a central annular part 500 may for example include three segments 501.

In FIG. 3B, the outer 400 and central 500 parts may each be provided in four segments or sub-parts, for example.

Providing a part 400, 500 in two or more segments or sub-parts may facilitate the assembly of the cable guiding assembly 300. Risk of breaking or damaging the parts 400, 500 during transportation to an installation site may be reduced. Segments may be attached to other segments of the same or different parts 400, 500 by mechanical fasteners and/or adhesives.

The inner part 600 could also be provided in two or more segments in some examples. In FIG. 3A, this part 600 is integrally formed.

A length 350 in cross section of the outer part 400 may in some examples be about 40, 50 or more centimeters. A length 350' of the central part 500 may be about 25, 35 or more centimeters. A length 350" of an inner part 600 may be about 10, 15 or more centimeters.

A width 355 of the outer part 400 and/or a width 355' of the central part 400 may be 5, 10, 15 or more centimeters. A width 355" of the inner part 600 may be 5, 10 or more centimeters.

A length 353 of a part 400, 500, 600 in an axial direction 305 may be 5, 10 or more centimeters.

Two consecutive recesses in a same part 400, 500 may be separated between 1 and 5 cm in a circumferential direction 310. Separation may also be higher than 5 cm.

One or more of the outer 400, central 500 and internal 600 parts may be made of plastic, for example of one or more thermoplastics. One or more of the parts 305, 310, 335 may be made of POM-C.

In some examples, as in FIG. 3A, the outer 400, central 500 and internal 600 parts may be annular parts.

Figure 5:
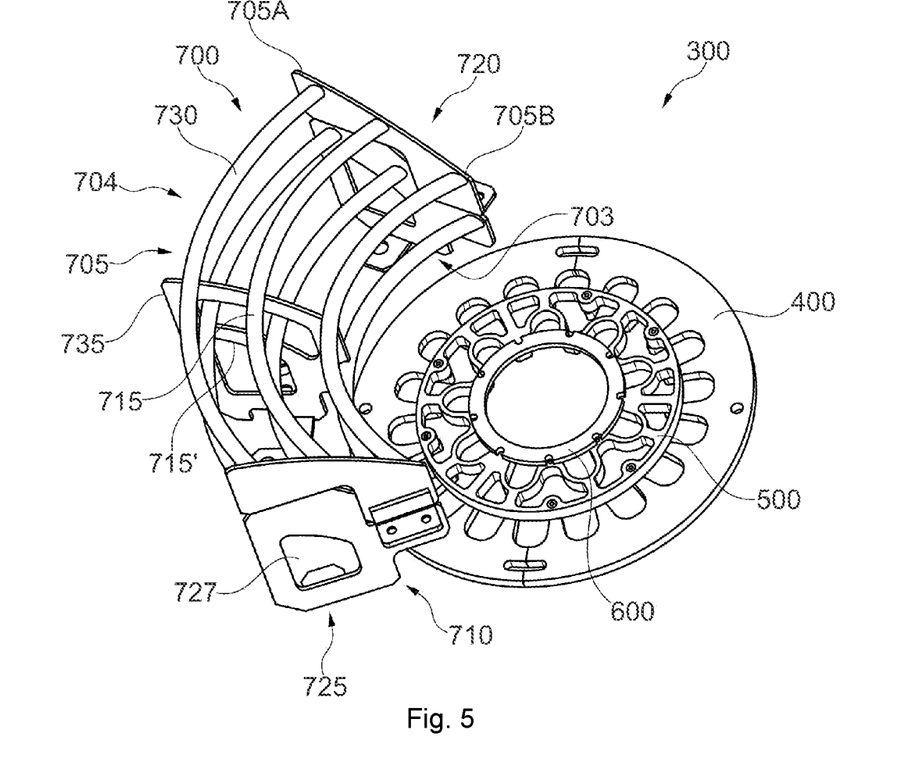
FIG. 5 schematically illustrates an example of a cable guiding assembly comprising a frame for guiding power cables towards a part of the cable guiding assembly.

The cable guiding assembly 300 may comprise a cable guiding frame 700 configured to guide cables from a first direction towards the recesses 425, 525 of the outer 400 and central 500 parts. FIG. 5 shows a perspective view of an example of such a cable guiding assembly 300. The frame 700 may have a top 705 and a bottom 710. The frame 700 may be attached, e.g. bolted, to a laterally outer portion 430 of the outer part 400 by a bottom 710 of the frame 700 in some examples.

The frame may comprise a plurality of cable support elements 730 such as bars, wherein the cable support elements which are laterally inside 730 are at a different height than the cable support elements which are laterally outside 704. In this example, the frame comprises a first plurality of bars forming a first support level (715'), and a second plurality of bars forming second higher support level (715).

A top 705 of the cable guiding frame 700 may vary in height (measured with respect to a same reference point). A top 705A of the cable guiding frame 700 configured to be placed farther to the outer part 400 may be higher than a top 705B of the cable guiding frame 700 configured to be placed closer to the outer part 400. A top 705 of the guiding frame 700 may taper in a radially inward direction 307 or in an inward transverse lateral direction 307'.

A change in height of a top 705 of the frame 700 may help to safely route power cables towards the outer 400 and central 500 parts. Excessive bending of the power cables may be avoided. A transition of a cable from a first direction, e.g. a horizontal or close to horizontal direction, to a second different direction, e.g. a vertical direction, may not damage the power cables.

The top 705 of the frame 700 may be convex in some examples, as in FIG. 5. A convex top 705 of the frame 700 may make a change in direction of cables smoother than a concave top 705.

Figure 6A:
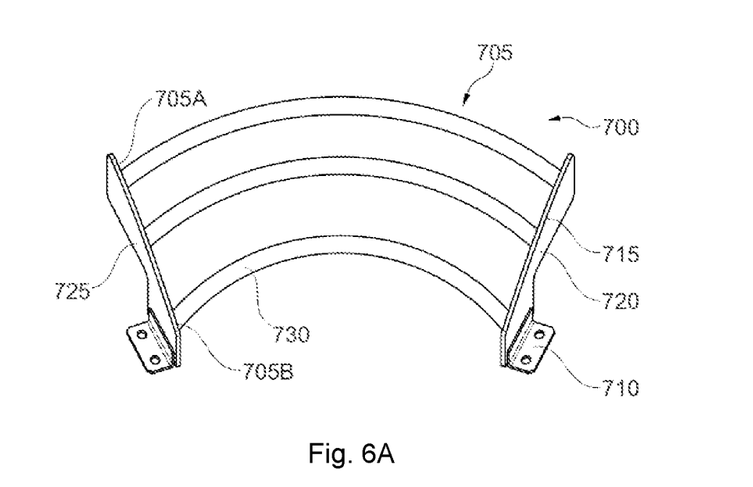
FIGS. 6A and 6B schematically illustrate two examples of a cable guiding frame.
Figure 6B:
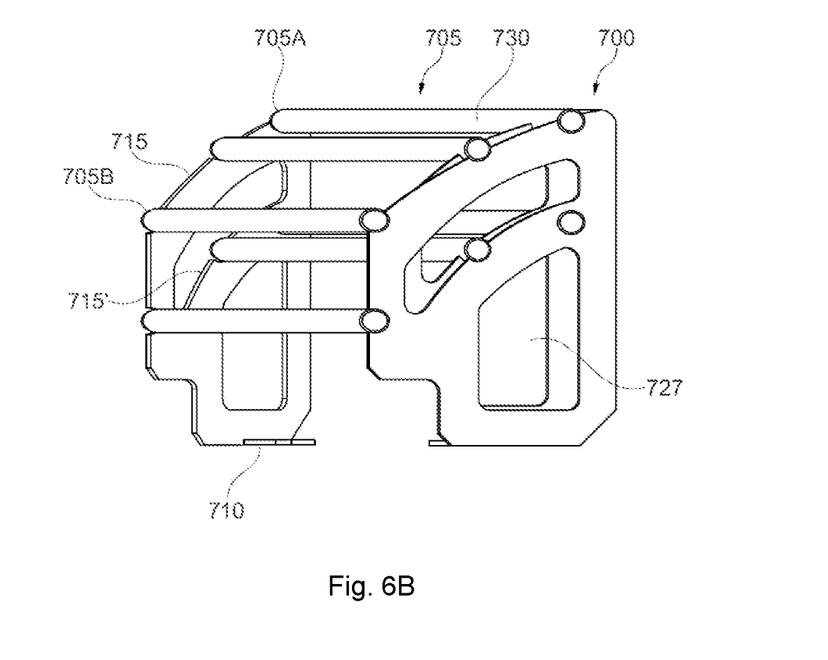

The cable guiding frame 700 may have one or more levels 715 for supporting power cables. In FIG. 6A, frame 700 only has one level of support 715 for power cables. The cable guiding frame 700 may comprise two levels of support 715, 715' for power cables, as shown in FIGS. 5 and 6B. If there is more than one level of support 715, each level of support 715, 715' may be at a different height, e.g. with respect to the parts 400 and 500, optionally also 600.

Each level of support 715, 715' for power cables may reduce its height as explained above in a radial inwards direction 323. Each level of support 715, 715' may taper in a radially inward direction 307 or in an inward transverse lateral direction 307'.

A cable guiding frame 700 may have a first end 720 and a second end 725. The first 720 and second 725 ends may hold cable support elements 730. An end 720, 725 of a guiding frame 700 may comprise one or more plates, for example one or more flat plates. An end 720, 725 of a frame 700 includes one flat plate in FIGS. 6A and 6B, whereas an end 720, 725 of a frame 700 includes two flat plates in FIG. 5, one above the other. The one or more plates may extend in an axial direction 315. The axial direction may be vertical direction. They may also extend in a radial 305 or transverse lateral direction 305'. A plate may include zero, one or more through holes 727.

At least a cable support element 730 may extend between the first 720 and second 725 ends in a lateral direction 310. The one or more cable support elements 730 may extend in a lateral direction 310. The one or more cable support elements (bars in this example) 730 may curved, as for example in FIGS. 5 and 6A. They 730 may also be straight, as in FIG. 6B.

A cable support element 730 may be a bar or rod, as shown in FIGS. 5, 6A and 6B. In other examples, a cable support element may be a plate. A flat or curved plate may extend between the first 720 and second 725 ends of the frame 700. Using bars or rods may decrease the weight of the cable guiding frame 700 and may facilitate the assembly of the frame 700. Opposite edges of a plate or opposite ends of rods may be welded to the ends 720, 725 of the frame 700.

The cable support elements 730 may further be held between the ends 720, 725 of the frame 700. For example, one or more middle plates 735 may be used to this end. Other supports 735 which are not plates are possible.

A maximum height of the guiding frame 700, e.g. in a portion 705A which is configured to be placed farthest from the outer part 400, may be 15 cm or more.

Figure 7:
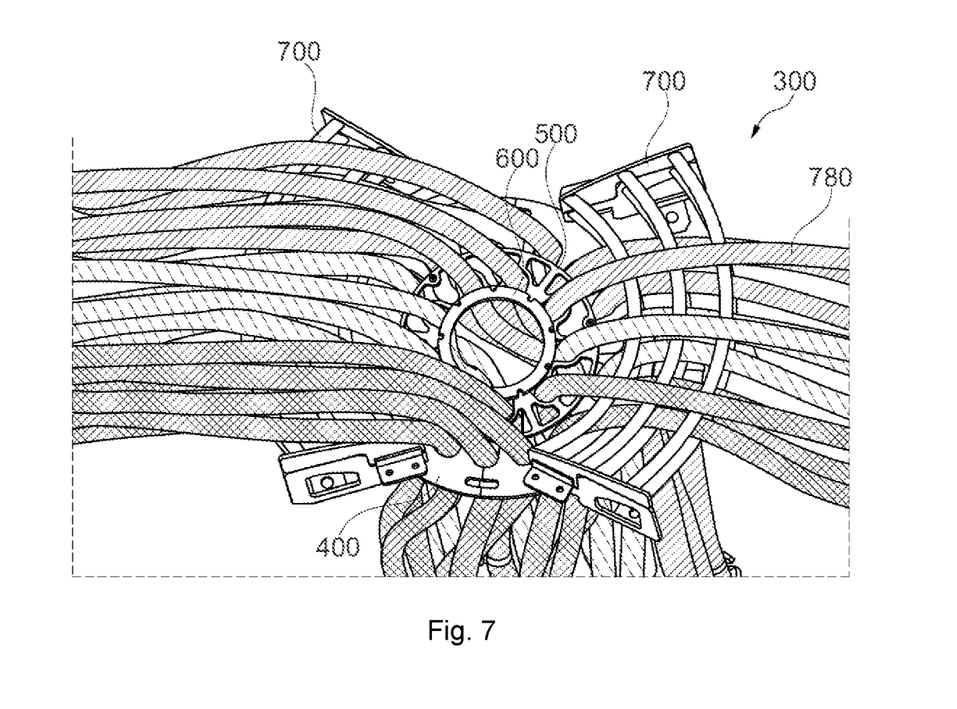
FIG. 7 schematically illustrates an example of cable guiding assembly changing a direction of power cables.

One or more than one cable guiding frames 700 may be used. For example, two guiding frames may be placed surround the outer 400 and central 500 parts and may be placed in front of each other, as in FIG. 7. "In front" may mean along a radial 305 or transverse lateral 305' direction. If a guiding frame 700 extends in a lateral circumferential direction 310 (see e.g. FIG. 3A), it may extend partially around (e.g. 90° or more but less than 360°) an outer 400 or central 500 part or it may extend totally around (i.e. 360°) a part 400. If a guiding frame 700 extends in a lateral straight direction 310 (see FIG. 3B), it may extend partially or totally along a laterally outer portion 430 of the outer part 400.

A cable guiding frame 400 may be made of steel in some examples. Stainless steel may be used.

It should be noted that it is not necessary that a cable guiding frame 700 overlaps or is attached to the outer part 400 for providing the abovementioned advantages. Improved and safer routing of cables towards the recesses 425, 525 of the parts outer 400 and central 500 parts may be obtained even if the guiding frame 700 is placed on or attached to a surface different from parts 400, 500.

Figure 8:
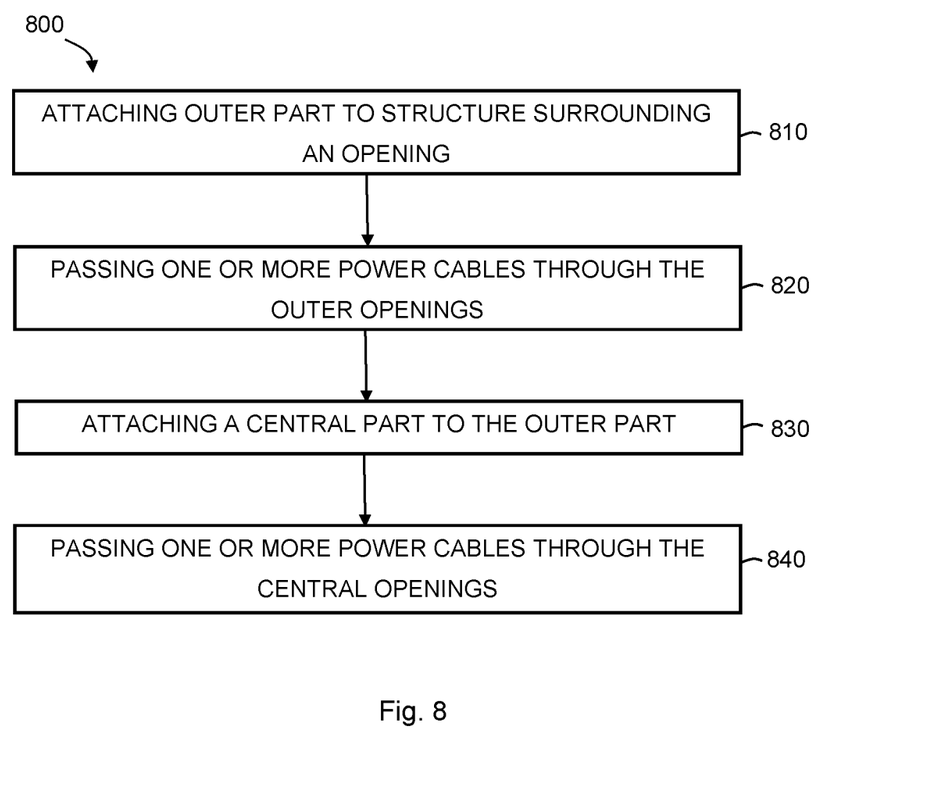
FIG. 8 schematically illustrates an example of a method for guiding power cables through an opening of a wind turbine.

In a further aspect of the invention, a method 800 for guiding power cables 780 through an opening of a wind turbine is provided. An opening in a wind turbine may be understood as an opening in any component or part of or inside a wind turbine. The component may be permanently or temporally installed. The method 800 may use a cable guiding assembly 300 as described above.

The method comprises, at block 810, attaching an outer part 400 having a top surface 405, a bottom surface 410, a laterally inner surface 415 and a laterally outer surface 420, the laterally inner surface 415 having a plurality of outer recesses 425 forming outer openings, to a structure surrounding the opening of the wind turbine.

An outer portion 430 of the outer part 400 may be directly or indirectly attached to a structure, e.g. a surface, surrounding the opening. If attachment is indirect, one or more intermediate parts may be placed between the outer part 400 and the surface surrounding the opening. A connector having a shape of the outer portion 430 of the outer part 400 may be attached to the surface surrounding the opening and then the outer part 400 may be attached to the connector.

For example, the opening may be circular, the connector may be a ring with a diameter slightly bigger than the diameter of the opening, and the outer part 400 may be annular and have a diameter substantially equal to that of the connector. Adhesive and/or mechanical fasteners may be used.

The method further comprises, at block 820, passing one or more power cables through the outer openings. For example, a first power cable may be passed through a recess 425 in the outer part 400.

If the outer part 400 includes two or more segments, some or all of the segments may be attached to a structure surrounding the opening before a power cable is passed through an opening 425 in the outer part 400.

The method further comprises, at block 830, attaching an outer portion 530 of a central part 500 having a top surface 505, a bottom surface 510, a laterally inner surface 515 and a laterally outer surface 520, the laterally inner surface 515 having a plurality of central recesses 525 forming central openings, to an inner portion 435 of the outer part 400. Power cables may be therefore retained in the outer openings.

The central part 500 may be attached to one or more protrusions 440, in particular to one or more protrusion tips 441, of the outer part 400. Nuts and bolts may be used. Attachment may take place along an axial direction 315, e.g. a bottom surface 510 of the central part 500 may contact a top surface 405 of the outer part 500, as in FIG. 3A. In this regard, a top surface of a part may be oriented towards a direction from which cables come from. A bottom surface of a part may be oriented towards a direction in which cables leave after passing through the recesses of the part. Alternatively, attachment may take place along a radial 305 or transverse lateral 305' direction.

The central part 500 may be attached before or after one or more power cables are passed through the recesses 425 of the outer part 400.

The method further comprises, at block 840, passing one or more power cables through the central openings. For example, a second power cable may be passed through a recess 525 in the central part 500. The second power cable is different from the first power cable.

If the central part 500 is provided in two or more segments, a power cable may be passed when some or all of the segment of the central part 500 are attached to the outer part 400. It is also possible that cables, e.g. both the first and second power cables, are passed after the central part 500 is attached to the outer part 400.

By using this method 800, power cables may be guided in a controlled way. Separation between the cables may be guaranteed by the distances between recesses in a same part, and also by the distances between recesses in different parts. An increase of temperature due to heat dissipation when passing power cables through a tight space may be avoided or at least reduced.

The power cables passing through the recesses 425 in the outer part 400 may be easily and quickly secured by attaching an outer portion 530 of the central part 500 to an inner portion 435 of the outer part 400. If necessary, an inner part 600 may be attached to an inner portion 535 of the central part 500 to secure the power cables in the recesses 525 of the central part 500. Attachment may be performed in an axial direction 315 or in a radial 305 or transverse lateral 305' direction.

In some examples, one or more power cables may be passed through a hollow inner part 600, such as the inner part 600 in FIG. 3A.

The method may further comprise attaching an inner part 600 to an inner portion 535 of the central part 500 to retain the power cables 780 in the central openings 525.

The method may further comprise arranging a cable guiding frame 700 with the outer part 400 and the central part 500, and passing a power cable 780 above the cable guiding frame 700. For example, a cable guiding frame 700 having a top 705 with tapering height may be attached to a surface surrounding the opening and/or to the top surface 405 of the outer annular part 400 such that a height of the top 705 of the guiding frame 700 decreases towards the opening. A power cable may then be passed above the cable guiding frame 700.

The use of a guiding frame 700 may avoid an excessive bending of power cables when being directed towards the recesses 425, 525 of the outer 400 and central 500 parts. For example, a guiding frame 700 may help to safely direct power cables from a horizontal or close to horizontal direction to a vertical direction. The curvature of the power cables may be controlled by adjusting a maximum height of a top 705 of a guiding frame 700 and how the height of the top 705 varies along a radial 305 or transverse lateral 305' direction.

When the cable guiding frame 700 comprises two or more levels of support 715, a power cable may be supported by a first level 715' of the guiding frame 700 and another power cable may be supported by a second level 715 of the guiding frame, the first and second levels being at different heights. The inclination (tapering) of a level of support may be different from the inclination of other level of support.

Installing one or more frames 700 for guiding cables may be done before or after installing the outer 400, central 500 and internal 600 parts. In some examples, one or more frames 700 and the outer part 400 are installed before routing one or more cables through the opening.

If there are two levels of support 715, 715' in the guiding frame 700, the power cables 780 supported by the first level 715' may be passed through the outer openings 425, and the power cables 780 supported by the second level 715 may be passed through the central openings 525. For example, the cables to be passed through recesses 425 in the outer part 400 may be supported by the top support 715 and the cables to be passed through recesses 525 in the central part 500 may be supported by the bottom support 715', as for example in FIGS. 5 and 7. Cables may be more organized and easier to track in this way.

In a further aspect of the invention, a cable harness mount 300 for wind turbine power cables 780 is provided. The cable harness mount 300 comprises an outer ring 400, a central ring 500 and an inner ring 600. The outer ring 400 comprises a radial inner surface 415 having an undulated shape which delimits protrusions 440 that extend radially inwards 307 and cut-outs 425 that extend radially outwards 307, the protrusions 440 being separated by the cut-outs 425 along a circumferential direction 310. The central ring 500 comprises a radial inner surface 515 having an undulated shape which delimits protrusions 540 that extend radially inwards 307 and cut-outs 525 that extend radially outwards 306, the protrusions 540 being separated by the cut-outs 525 along a circumferential direction 310.

Power cables may be routed in an organized and safe way. The cables in the cable harness may be sufficiently separated among them so that power losses do not cause an increase of temperature over a certain temperature threshold.

The inner ring 600 is configured to be attached to an inner portion 535 of the central ring 500, e.g. to some or all the protrusions 540 of the central ring 500. An outer portion 530 of the central ring 500 is configured to be attached to an inner portion 435 of the outer ring 400, e.g. to some or all the protrusions 540 of the central ring 500.

The cut-outs or recesses 525 of the central ring 500 may be offset 330 from the cut-outs 425 of the outer ring 400 in a circumferential direction 300. The explanation above regarding whether all, some or none recesses may be aligned in a radial direction 305 applies. Cables may be easily changed from a flat arrangement to a trefoil arrangement with this cut-out configuration.

The cut-outs 425 of the outer ring 400 may double in number the cut-outs 425 of the central ring 500. The number of obtainable trefoil arrangements may be maximized in such a situation.

The central ring 500 may further comprise through holes 550 across the central ring 500 in an axial direction 315. The cable harness may be cooled while the weight of the central ring 500 may be decreased. The one or more through holes 550 for cooling are different from the cut-outs 525 for routing the cables. The first ones 550 have a closed cross-section in a plane perpendicular to an axial direction 315 whereas the second ones 525 have an open cross-section in a plane perpendicular to an axial direction 315.

The cable harness mount 300 may further comprise a frame 700 with a top 705 having a varying height configured to direct power cables towards a more vertical direction. The vertical direction may be an axial direction 315. A top 705 of the frame 700 may decrease its height in a radial inwards direction 307.

The frame 700 may have one or more levels of support 715 as explained above.

The explanations provided above with respect to FIGS. 3A to 7 may also be applied to the cable harness mount 300. Similarly, such a cable harness mount 300 may also be used in a method 800 as described above.

In an example, the cable harness mount may be arranged in an opening in the nacelle, specifically an opening in a crane assembly. The cable harness mount may serve to redirect the power cables from a substantially horizontal direction towards a substantially vertical direction. The power cables may further extend downwards through the wind turbine tower.

In a plurality of locations along the wind turbine tower, and/or in a plurality of locations along a substantially horizontal direction (upstream from the cable harness mount), cable organizers, or cable assemblies may be arranged in which the power cables are arranged substantially parallel to one another.

Throughout the present disclosure, reference has been made to power cables. Dimensions and materials of the power cables may vary. For example, a cable (MVhigh-cable, 20-35 kV) for the higher middle voltage power transmission made of copper may have a cross section of at least 55 mm$^2$, specifically at least 60 mm$^2$, more specifically at least 65 mm$^2$, and/or of around 70 mm$^2$, and/or may have a cross section not larger than 80 mm$^2$, more specifically not larger than 80 mm$^2$.

A cable (MVhigh-cable, 20-35 kV) for the higher middle voltage power transmission made of aluminum may have a cross section of at least 85 mm$^2$, specifically at least 90 mm$^2$, and/or of around 95 mm$^2$, and/or may have a cross section not larger than 110 mm$^2$, in particular not larger than 100 mm$^2$, more specifically not larger than 95 mm$^2$.

A cable (MVlow-cable, ca. 10 kV) for the lower middle voltage power transmission made of copper may have a cross section of at least 150 mm$^2$, in particular at least 170 mm$^2$, preferably at least 180 mm$^2$, and/or of around 185 mm$^2$, and/or may have a cross section not larger than 230 mm$^2$, preferably not larger than 210 mm$^2$, further preferred not larger than 190 mm$^2$.

A cable (MVlow-cable, ca. 10 kV) for the lower middle voltage power transmission made of aluminum may have a cross section of at least 200 mm$^2$, in particular at least 220 mm$^2$, preferably at least 230 mm$^2$, and/or of around 240 mm$^2$, and/or may have a cross section not larger than 280 mm$^2$, specifically not larger than 260 mm$^2$, more specifically not larger than 250 mm$^2$.

According to an additional or alternative embodiment, electrical energy as generated by the generator having a voltage of 400 V to 1000 V is guided through the tower to an electrical power component, switches and/or to a transformer for being transformed to medium voltage (10-35 KV) by said components located at a lower position than the nacelle.

The number of power cables may vary particularly dependent on the configuration of the generator, and particularly on the number of phases. In examples, the wind turbine may comprise at least 9 power cables, specifically at least 12 power cables, and more specifically between 15 and 24 cables.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A cable guiding assembly for guiding power cables in a wind turbine tower, comprising:
    a central part comprising a top surface, a bottom surface, a laterally inner surface, and a laterally outer surface, the laterally inner surface comprising a plurality of central recesses forming central openings configured for receipt of the power cables;

an outer part surrounding the central part, the outer part comprising a top surface, a bottom surface, a laterally inner surface, and a laterally outer surface, the laterally inner surface comprising a plurality of outer recesses forming outer openings configured for receipt of the power cables;

an outer portion of the central part attachable to an inner portion of the outer part such that the central part delimits the outer openings; and an inner part attachable to an inner portion of the central part such that the inner part delimits the central openings.

2. The cable guiding assembly of claim 1, each of the outer, central, and inner parts are annular parts.

3. The cable guiding assembly of claim 1, wherein the central recesses in the central part are offset from the outer recesses in the outer part along a circumferential direction.

4. The cable guiding assembly of claim 1, wherein a number of the outer recesses is twice that of the central recesses.

5. The cable guiding assembly of claim 1, wherein the central part further comprises one or more through holes extending in an axial direction.

6. The cable guiding assembly of claim 1, wherein one or both of the outer and the central part are made from a plurality of segments.

7. The cable guiding assembly of claim 1, further comprising a frame configured to redirect the power cables from a first direction towards the outer and central recesses of the outer and central parts, respectively.

8. The cable guiding assembly of claim 7, wherein the frame comprises a plurality of laterally inside support elements that are at a different height than a plurality of laterally outside support elements.

9. The cable guiding assembly of claim 7, wherein the frame comprises a first plurality of support elements forming a first support level, and a second plurality of support elements forming second higher support level.

10. A method for guiding power cables along an opening in a wind turbine, the method comprising:

attaching an outer part to a structure surrounding the opening, the outer part having a top surface, a bottom surface, a laterally inner surface, and a laterally outer surface, the laterally inner surface of the outer part having a plurality of outer recesses forming outer openings;

passing one or more of the power cables through the outer openings;

attaching an outer portion of a central part to an inner portion of the outer part to retain the power cables in the outer openings;

the central part having a top surface, a bottom surface, a laterally inner surface, and a laterally outer surface, the laterally inner surface of the central part having a plurality of central recesses forming central openings;

passing one or more of the power cables through the central openings; and attaching an inner part to an inner portion of the central part to retain the power cables in the central openings.

11. The method of claim 10, further comprising arranging a cable guiding frame with the outer part and the central part, and passing one or more of the power cables above the cable guiding frame.

12. The method of claim 11, wherein one or more of the power cables are supported by a first level of the guiding frame and one or more other power cables are supported by a second level of the guiding frame, the first and second levels being at different heights.

13. The method of claim 12, wherein the power cables supported by the first level are passed through the outer openings, and the power cables supported by the second level are passed through the central openings.

* * * * *